United States Patent Office.

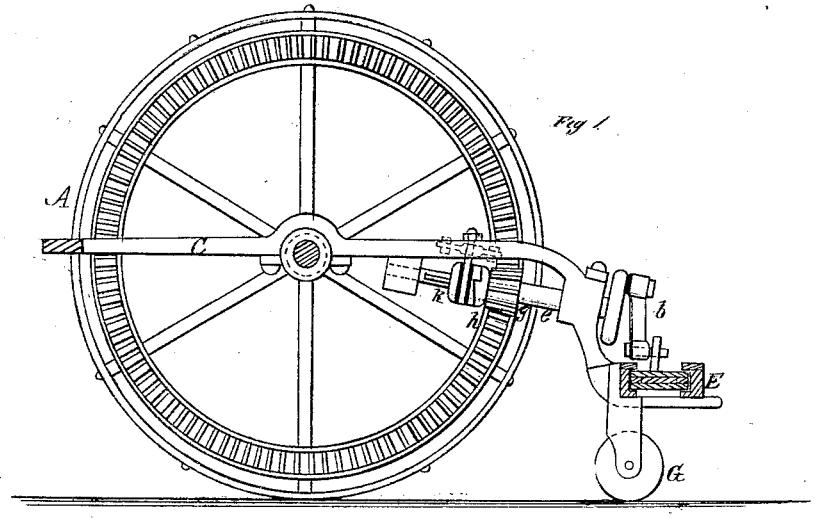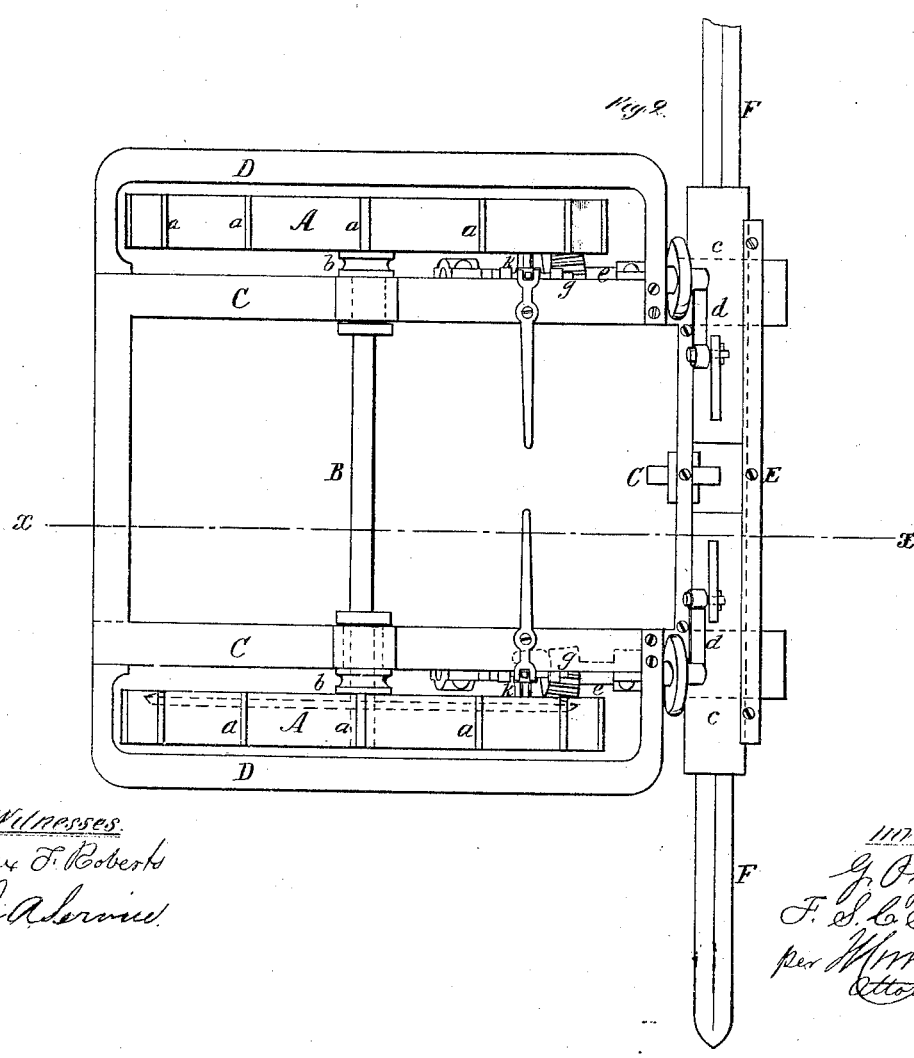

GEORGE PYE AND F. S. C. SOUTHER, OF SOUTH BOSTON, MASSACHUSETTS.

*Letters Patent No. 63,559, dated April 2, 1867.*

---

IMPROVEMENT IN MACHINE FOR CUTTING STALKS IN THE FIELD.

---

*The Schedule referred to in these Letters Patent and making part of the same.*

---

TO ALL WHOM IT MAY CONCERN:

Be it known that we, GEORGE PYE and F. S. C. SOUTHER, of South Boston, in the county of Suffolk, and State of Massachusetts, have invented a new and improved Machine for Cutting Corn, Cane, and other Stalks; and we do hereby declare that the following is a full, clear, and exact description thereof, which will enable others skilled in the art to make and use the same, reference being had to the accompanying drawings, forming part of this specification, in which—

Figure 1 is a sectional side view taken in the line $xx$, fig. 2.

Figure 2 is a plan or top view of the machine of our invention.

Similar letters of reference indicate like parts.

This invention relates to an improved machine for cutting the stalks of Indian corn, sugar cane, or other similar standing plants in the field; and consists of a double set of knives, (working transversely to the rows,) which are connected by gear with the driving-wheels of a truck that travels between the rows. The framing and gear connnections are constructed with a view to simplicity and facility in the arrangement, and to insure strength and durability.

A A are cast-iron driving-wheels attached to axle B; they are made with a broad tread, on which are placed or cast spurs or ribs, $aa$, to give them greater tractive power. On the inside of the hubs of the wheels, and forming a part thereof, are cast the journals and collars, $bb$, on which the rectangular cast-iron or wooden rocking-frame C C is suspended, and attached to said frame are guards, D D, on each side of the wheels. The frame is so constructed, as will be seen by reference to figs. 1 and 2, that the cutting-knives can be placed and operated either before or after the driving-wheels, with equal facility, by simply reversing the frame on its axes or journals. The cross-piece E is a part of a rectangular frame supporting the cutting-knives F F, which project from it laterally and horizontally, as shown in fig. 2. It will be seen by reference to fig. 1, that the frame C C is so constructed that the cutting-knives shall be set as near down to the ground as may be necessary to perform the work required, and under the middle of the cross-piece E may be placed a small adjustable supporting guide-roller or wheel, G. The cutting-knives F F are fastened at their inner ends to slides $cc$, which traverse in the cross-piece E, and are worked by adjustable cranks $dd$, on the ends of short shafts $ee$ lying under or alongside of frame C C, and are actuated by a small pinion, $gg$, engaging in the concentric toothed rims $hh$ on the inside of the driving-wheels A A. The concentric toothed rims are cast with and form a part of the driving-wheels. It will be seen that when the machine travels the concentric toothed rims $hh$ will operate the pinions $gg$, and that the cranks $dd$ will give the cutting-knives F F a quick lateral or sawing motion which will instantly sever the cane or corn-stalks when they come abreast of them. The edges of the knives may be serrated to make them more effective in cutting. The machine will be drawn by one or more horses, and the driver will be seated in a convenient position over the frame, which will be connected with a lever under his immediate control for raising and lowering the cutting apparatus when required. The cutter slides will be so arranged that the distance from centre to centre of motion of the knives shall be adjusted to conform to the width, more or less, from centre to centre of the rows of stalks, &c., to be cut, and the knives may be secured to or form a part of the transverse slides. The pinions $gg$ are thrown in or out of gear with the concentric toothed rims $hh$, so that the operation of the cutting-knife on either side may be suspended, while the knife on the opposite side continues to work, or both knives may be held stationary, at the will of the driver, by means of the clutches K K.

Having thus described our invention, what we claim, and desire to secure by Letters Patent, is—

1. The machine for cutting corn, cane, and other stalks in the field, constructed, arranged, and operating substantially as herein described.

2. We claim, also, the transverse sliding-knives F F, operated by the cranks $dd$, in combination with the pinions $gg$, and the concentric toothed rims $hh$, on the driving-wheels A A, constructed and operating substantially as and for the purposes herein described.

3. We also claim the rocking-frame C C, and cross-bar E, in combination with the axle B, constructed and operating substantially as and for the purposes herein described.

GEORGE PYE,
F. S. C. SOUTHER.

Witnesses:
 EDWARD LALLY,
 MICHAEL A. THOMPSON.